United States Patent [19]
Hrupka

[11] Patent Number: 5,452,773
[45] Date of Patent: Sep. 26, 1995

[54] SIDE LOAD CARRIER GOLF CART

[76] Inventor: Dennis J. Hrupka, 1920 42nd Street No. 2, Kenosha, Wis. 53140

[21] Appl. No.: 149,947

[22] Filed: Nov. 10, 1993

[51] Int. Cl.[6] ............................................. B62D 61/08
[52] U.S. Cl. .............................. 180/216; 280/DIG. 5; 224/42.32; 224/274; 248/96
[58] Field of Search ................. 280/DIG. 5, DIG. 6, 280/79.6; 180/65.1, 216; 224/42.32, 42.45 R, 274, 324; 248/96, 309.1, 520, 538; 410/32, 49

[56] References Cited

U.S. PATENT DOCUMENTS

| | | | |
|---|---|---|---|
| D. 187,787 | 5/1960 | MacCoon | 280/DIG. 5 X |
| 2,822,969 | 2/1958 | Cooper | 224/42.32 |
| 2,919,758 | 1/1960 | Newton et al. | 280/DIG. 5 X |
| 2,973,048 | 2/1961 | Jensen | 224/42.32 X |
| 3,042,443 | 7/1962 | Laher | 280/DIG. 5 X |
| 3,108,481 | 10/1963 | Westmont | 280/DIG. 5 X |
| 3,580,349 | 5/1971 | Brennan et al. | 280/DIG. 5 X |
| 3,884,439 | 5/1975 | Jeninga | 248/96 |
| 4,533,013 | 8/1985 | Hightower | 280/DIG. 5 X |
| 4,874,055 | 10/1989 | Beer | 280/DIG. 5 X |
| 5,088,635 | 2/1992 | Taylor et al. | 248/96 X |

*Primary Examiner*—Brian L. Johnson
*Attorney, Agent, or Firm*—Michael I. Kroll

[57] ABSTRACT

A side load carrier golf cart is provided which consists of a body member having a front portion, a central portion and a rear portion. A mechanism is within the rear portion of the body member for holding a pair of golf bags at an angle upwardly and forwardly to a side of a driver and passenger in the central portion of the body member. The driver and passenger can remove their clubs from their golf bags without having to leave the central portion of the body member.

8 Claims, 2 Drawing Sheets

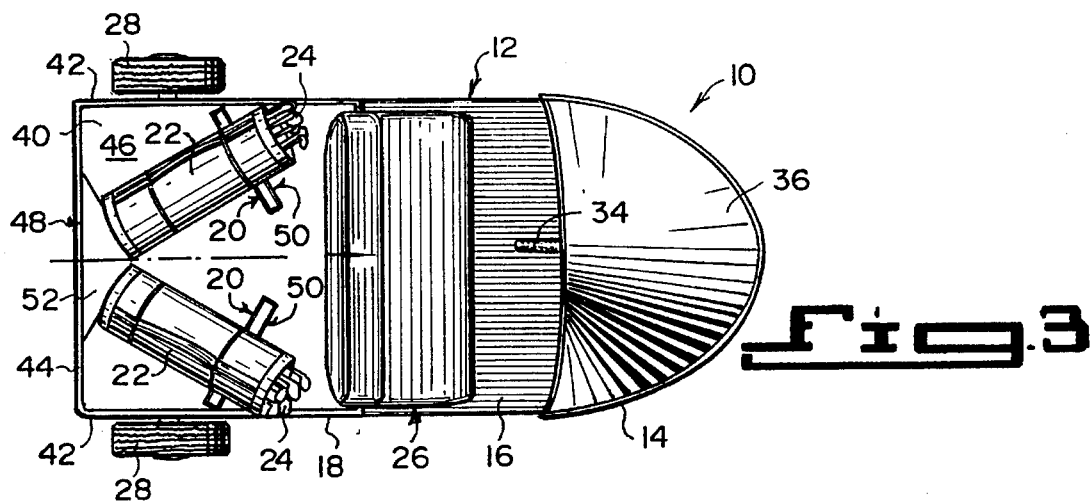
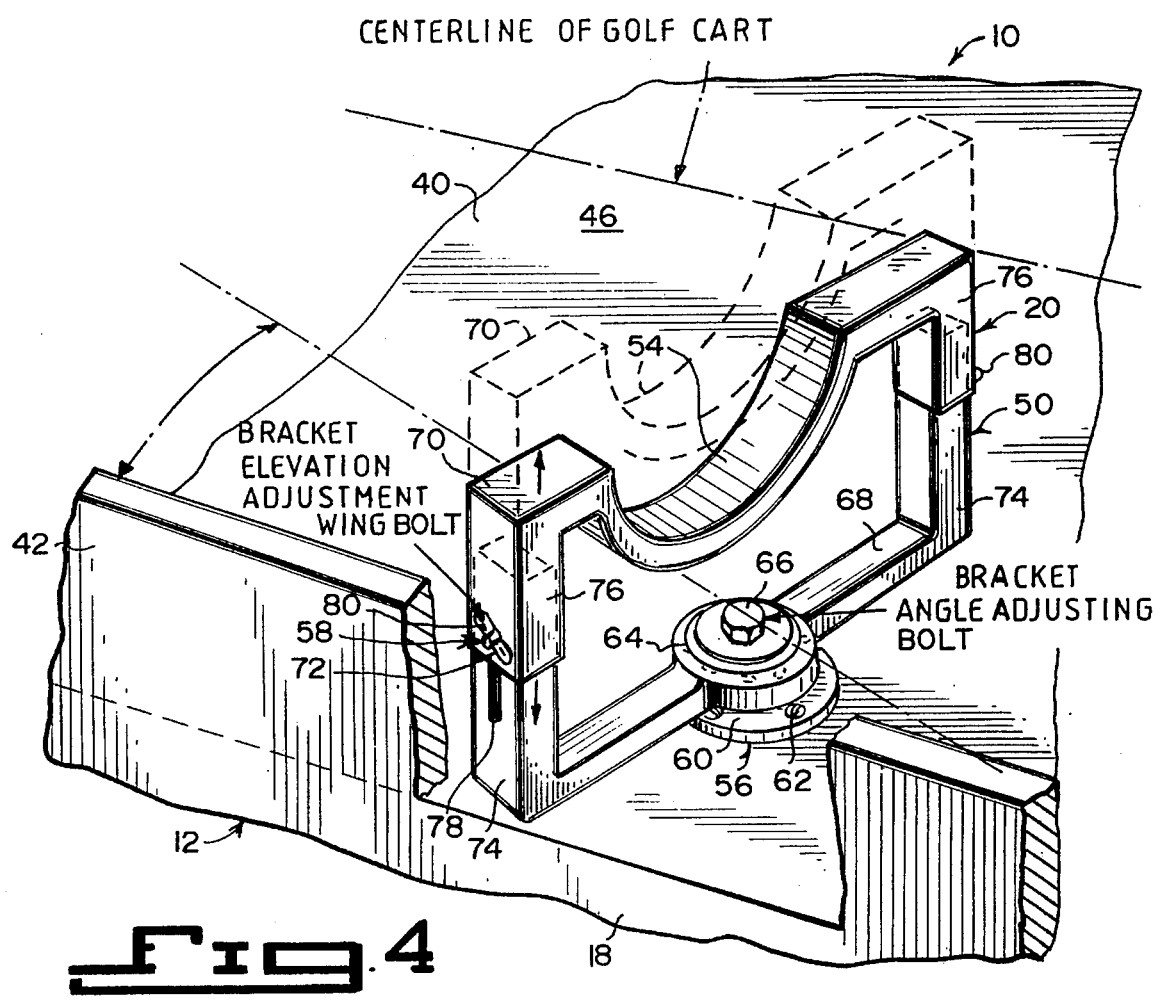

SIDE LOAD CARRIER GOLF CART

BACKGROUND OF THE INVENTION

1. Field of the Invention

The instant invention relates generally to motorized golf carts and more specifically it relates to a side load carrier golf cart.

2. Description of the Prior Art

Numerous motorized golf carts have been provided in prior art. For example, U.S. Pat. Nos. 2,919,758 to Newton et al.; 3,042,443 to Laher; 3,580,349 to Brennan and 4,874,055 to Beer all are illustrative of such prior art. While these units may be suitable for the particular purpose to which they address, they would not be as suitable for the purposes of the present invention as heretofore described.

Newton et al

Knockdown Powered Golfing Cart

U.S. Pat. No. 2,919,758

The powered golfing cart is a simple three wheeled cart powered by a small motor and which can be quickly dismantled by the user into easily lifted parts. It consists of a golf bag holder, a handle bar unit, a front wheel unit and a rear wheel motor unit. The self powered golfing cart is readily broken down into component parts that are easily lifted and stored in an automobile truck compartment. The entire machine when assembled, is capable of carrying an individual golfer and yet is light enough that it can be easily packed up or moved over obstructions without undue exertion.

Laher

Device for Holding Golf Bags

U.S. Pat. No. 3,042,443

The apparatus in combination with a golf cart is for holding a plurality of golf bags. An upper surface of the cart is disposed to directly support the bags from beneath. A rack is secured to the golf cart in the region of the surface and is constructed to define a supporting frame at a predetermined height above the surface. The frame defines a golf bag receiving opening, the extent of the predetermined height being sufficiently limited to cause the golf bags disposed within the frame to lie across the cart. A structure is disposed across the opening to releasably engage the golf bags positioned therein. The structure consists of a resilient deformable member extending transversely of the cart to generally divide the opening into a forward and a rear portion.

Brennan

Portable Motorized Cart

U.S. Pat. No. 3,580,349

The portable motorized cart is useful for transporting a person and his golf clubs over a golf course, a person over a sand dune or beach, and/or a person around an industrial area, etc. The cart is conveniently adjusted to a smaller overall size for its over road transportation, for example, in the trunk space of an automobile. Compaction of the cart for such storage and travel involves tilting of a foot rest or floor, telescoping of frame members, tilting of a steering and control mechanism and, as necessary, removal of a seat and a golf club bracket. The golf bag and clubs are held in place by the removable bracket, which is inserted sideways into a seat frame receiver and into a frame received.

Beer

Chariot Type Golf Cart

U.S. Pat. No. 4,874,055

The motorized golf cart has a frame that supports a platform upon which a golfer may stand while straddling a golf bag supported upon the platform along an incline. A U-shaped articulated steering bar is provided, for adjustable positioning of a handle portion of the bar in forward and intermediate positions for control by a walking and riding golfer, respectively, and in a rear position for supporting the cart upendedly for storage.

SUMMARY OF THE INVENTION

A primary object of the present invention is to provide a side load carrier golf cart that will overcome the shortcomings of the prior art devices.

Another object is to provide a side load carrier golf cart for holding a pair of golf bags at an angle upwardly and forwardly to the side of the driver and passenger, so that the golfers can remove their clubs while still sitting in their seats.

An additional object is to provide a side load carrier golf cart that will reduce the time it takes for the golfers to remove their clubs from the bags, since they do not have to get out of the golf cart and walk around to the rear in order to get to their clubs.

A further object is to provide a side load carrier golf cart that is simple and easy to use.

A still further object is to provide a side load carrier golf cart that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 3 is a top view taken in the direction of arrow 3 in FIG. 2.

FIG. 4 is an enlarged side perspective view with parts broken away and in section showing one of the adjustable brackets in greater detail.

DETAILED DESCRIPTION OF THE PREFERRED EMBODIMENTS

Figure 1:
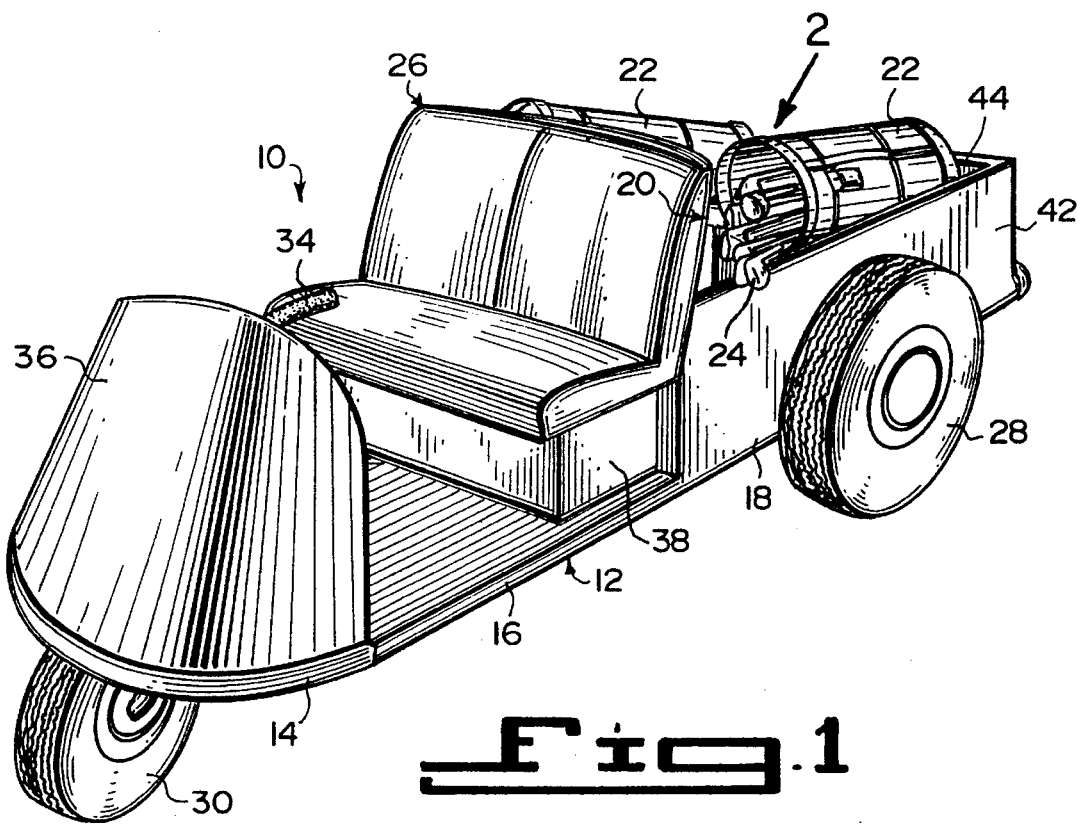
FIG. 1 is a front perspective view of the instant invention.
Figure 2:
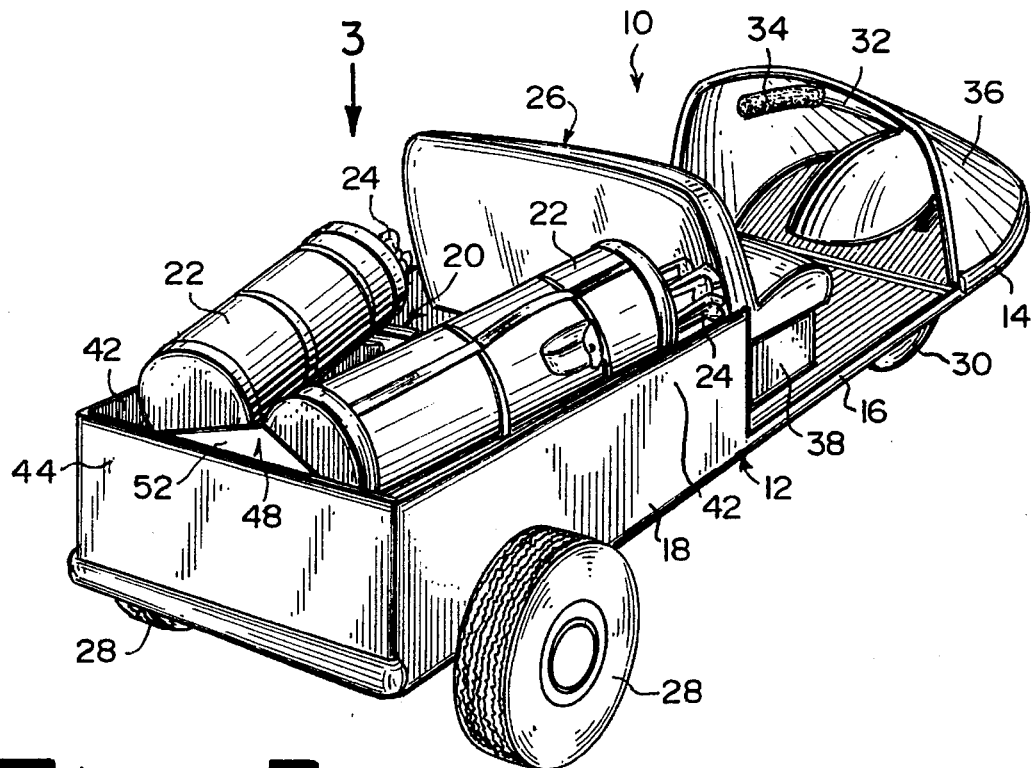
FIG. 2 is a rear perspective view taken in the direction of arrow 2 in FIG. 1.

Turning now descriptively to the drawings, in which similar reference characters denote similar elements throughout the several views, FIGS. 1 through 4 illustrate a side load carrier golf cart 10, which consists of a body member 12 having a front portion 14, a central portion 16 and a rear portion 18. A mechanism 20 is within the rear portion 14 of the body member 12 for holding a pair of golf bags 22 at an angle upwardly and forwardly to a side of a driver and passenger (not shown) in the central portion 16 of the body member 12. The driver and passenger can remove their clubs 24 from their golf bags 22 without having to leave the central portion 16 of the body member 12.

A seat assembly 26 is mounted onto the central portion 16 of the body member 12, so that the driver and passenger may sit upon the seat assembly 26. A pair of rear drive wheels 28 are transversely mounted to the rear portion 18 of the body member 12. A steerable front wheel 30 is mounted to the front portion 14 of the body member 12, so that the body member 12 can travel over the terrain.

A steering control arm 32 is coupled to the steerable front wheel 30 at the front portion 14 of the body member 12. A hand grip 34 is affixed to a distal free end of the steering control arm 32, so that it can be engaged by a hand of the driver. A windshield 36 is mounted to the front portion 14 of the body member 12. An electric motor 38 is mounted under the seat assembly 26, so that the electric motor 38 can operate the rear drive wheels 28.

A floor bed 40 is on the rear portion 18 of the body member 12. A pair of side walls 42 extend upwardly from the floor bed 40. A rear wall 44 extends upwardly from the floor bed 40, thereby forming a compartment 46 for the holding mechanism 20.

The holding mechanism 20 includes an abutment member 48 mounted onto the floor bed 40 directly behind the rear wall 44. A pair of bracket members 50 are mounted in a spaced apart relationship onto the floor bed 40 directly behind the seat assembly 26 and adjacent the side walls 42. The golf bags 22 are angled upwardly and forwardly between the abutment member 48 and the respective bracket members 50. The golf clubs 24 can be removed when the driver and passenger are sitting on the seat assembly 26. The abutment member 48 is a triangular shaped housing 52, to allow a bottom end of each golf bag 22 to make contact against one side of the triangular shaped housing 52 and extends at an angle forwardly therefrom.

As best seen in FIG. 4, each bracket member 50 includes a cradle 54, so that a forward end of the golf bag 22 can be nestled upon the cradle 54. Each bracket member 50 also includes a device 56 for angle adjusting the bracket member 50 to the floor bed 40. An apparatus 58 is for height adjusting the bracket 50 to the floor bed 40.

The angle adjusting device 56 consists of a base 60 and a plurality of fasteners 62, for securing the base 60 to the floor bed 40. A hub 64 is on a central bottom portion of the bracket member 50. The hub 64 fits over and pivots upon the base 60, so as to change the angle of the bracket member 50. A bolt 66 extends through the hub 64 and into the base 60. When the bolt 66 is tightened, it will retain the bracket member 50 in a stationary position.

The height adjusting device 58 comprises the bracket member 50 having a stationary lower frame segment 68 connected to the hub 64 and an upper frame segment 70 adjustable to the lower frame segment 68. A structure 72 is for securing the upper frame segment 70 to the lower frame segment 68.

The lower frame segment 68 has two oppositely positioned square shaped arms 74 extending upwardly. The upper frame segment 70 has two oppositely positioned square shaped arms 76 extending downwardly, which fits onto and slides upon the square shaped arms 74 of the lower frame segment 68. The securing structure 72 includes each arm 74 on the lower frame segment 68 having a vertical slot 78. A pair of wing head bolts 80 are provided. Each extend through one slot 78 in one arm 74 on the lower frame segment 68 and through one arm 76 in the upper frame segment 70, to secure the upper frame segment 70 to the lower frame segment 68.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A side load carrier golf cart which comprises:
   a) a body member having a front portion, a central portion and a rear portion;
   b) means within said rear portion of said body member for holding a pair of golf bags at an angle upwardly and in a forward facing direction to a rearward side of a driver and passenger in said central portion of said body member;
   c) a seat assembly mounted onto said central portion of said body member, so that the driver and passenger may sit upon said seat assembly;
   d) a pair of rear drive wheels transversely mounted to said rear portion of said body member; and
   e) a steerable front wheel mounted to said front portion of said body member, so that said body member can travel over the terrain;
   f) a steering control arm coupled to said steerable front wheel at said front portion of said body member;
   g) a hand grip affixed to a distal free end of said steering control arm, so that said handle can be engaged by a hand of the driver; and
   h) a windshield mounted to said front portion of said body member;
   i) an electric motor mounted under said seat assembly;
   j) a floor bed on said rear portion of said body member;
   k) a pair of side walls extending upwardly from said floor bed; and
   l) a rear wall extending upwardly from said floor bed thereby forming a compartment for said holding means, said holding means including an abutment member mounted onto said floor bed directly in front of said rear wall, and a pair of bracket members mounted in a spaced apart relationship onto said floor bed directly behind said seat assembly and adjacent said side walls with the golf bags angled upwardly and forwardly between said abutment member and said respective bracket members, so that the golf clubs can be removed when the driver and passenger are sitting on said seat assembly.

2. A side load carrier golf cart as recited in claim 1, wherein said abutment member is a triangular shaped housing to allow a bottom end of each golf bag to make contact against one side of said triangular shaped housing and extend at an angle forwardly therefrom.

3. A side load carrier golf cart as recited in claim 2, wherein each said bracket member includes a cradle, so that a forward end of the golf bag can be nestled upon said cradle.

4. A side load carrier golf cart as recited in claim 3, wherein each said bracket member includes:
   a) means for angle adjusting said bracket member to said floor bed; and
   b) means for height adjusting said bracket to said floor bed.

5. A side load carrier golf cart as recited in claim 4, wherein said angle adjusting means includes:
   a) a base;
   b) a plurality of fasteners for securing said base to said floor bed;
   c) a hub on a central bottom portion of said bracket member, said hub fits over and pivots upon said base, so as to change the angle of said bracket member; and
   d) a bolt which extends through said hub and into said base, so that when said bolt is tightened said bolt will retain said bracket member in a stationary position.

6. A side load carrier golf cart as recited in claim 5, wherein said height adjusting means includes:
   a) said bracket member having a stationary lower frame segment connected to said hub and an upper frame segment adjustable to said lower frame segment; and
   b) means for securing said upper frame segment to said lower frame segment.

7. A side load carrier golf cart as recited in claim 6, further including:
   a) said lower frame segment having two oppositely positioned square shaped arms extending upwardly;
   b) said upper frame segment having two oppositely positioned square shaped arms extending downwardly which fit onto and elide upon said square shaped arms of said lower frame segment.

8. A side load carried golf cart as recited in claim 7, wherein said securing means includes:
   a) each said arm on said lower frame segment having a vertical slot; and
   b) a pair of wing head bolts, each extending through one said slot in one said arm on said lower frame segment and through one said arm in said upper frame segment, to secure said upper frame segment to said lower frame segment.

* * * * *